United States Patent [19]
Kinne

[11] 3,857,787
[45] Dec. 31, 1974

[54] MECHANICAL SKIMMER
[76] Inventor: Howard R. Kinne, 147 Front St., Beaver Dam, Wis. 53916
[22] Filed: Jan. 17, 1972
[21] Appl. No.: 218,214

[52] U.S. Cl. .............................................. 210/470
[51] Int. Cl. ............................................ B01d 35/28
[58] Field of Search .................................... 210/470

[56] References Cited
UNITED STATES PATENTS
| | | | |
|---|---|---|---|
| 1,066,788 | 7/1913 | Bowen | 210/470 X |
| 2,813,631 | 11/1957 | Odman | 210/470 X |
| 3,289,850 | 12/1966 | Gubash | 210/470 |

Primary Examiner—Samih N. Zaharna
Assistant Examiner—F. F. Calvetti
Attorney, Agent, or Firm—James A. Hauer

[57] ABSTRACT

A mechanical skimmer construction which assists a fisherman in the cutting and digging operation involved when a fisherman, while preparation for ice fishing, cuts a hole or holes in the frozen ice, wherein a mechanical construction allows easy and efficient cleaning and maintainence of ice hole, keeping ice and ice chips from interference in the hole, either as the hole is being formed or after it is formed during fishing operation.

4 Claims, 4 Drawing Figures

PATENTED DEC 31 1974

3,857,787

MECHANICAL SKIMMER

BACKGROUND OF INVENTION

The prior art and very recently parketed devices of the type adapted for removal of ice or ice chips from an ice fishing hole have been very simple strainer or seive devices having a handle extension for dipping into the hole and shaking or knocking the ice chips off in a succesion of such movements. To provide a simple and effective device which permits accomplishing the cleaning operation, as above indicated, the design was completed to accomplish providing a device which allows the person using the device to remain in a somewhat upright standing position (without kneeling) and efficiently remove ice or ice chips from a hole as it is being cut or after the hole is completed and ice begins to reform about the perimeter of the open hole.

Seives, dippers, skimmers and devices now available lack a certain efficiency and success for a number of reasons, and ice fishermen have a desire to use a device of the type disclosed by the inventor.

SUMMARY OF THE INVENTION

The inventive concept of the present invention resides in the provision of a disgn for a mechanical skimmer which has a simple and effective construction for utilization during fishing operation by ice fishermen, whether in use of a regular ice fishing operation or in open hole spear fishing or the like. The enjoyment and effectiveness of ice fishing becomes a very defined and precise process for many fishermen. It becomes an absolute fettish to have the unusual and the distinctive device, of any type, for fishing and this continues in the efforts of ice fishermen to get the latest and best devices for use in his fishing.

The present design permits a comfortable and efficient use of a skimmer different in its use and application in that the small annoyances of present devices become the big annoyances in such a hobby and pasttime as ice fishing. This device permits, without kneeling or bending over, to insert the device, without disturbing the hole and scaring fish, and effectively remove ice formations or ice chips.

Figure 1:
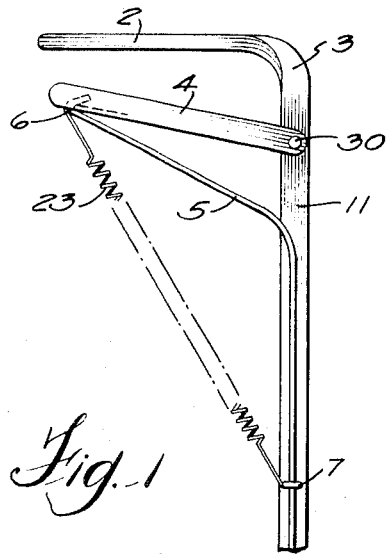
FIG. 1 is an elevational view showing the ice and the formed ice fishing hole in the ice, in cross-section, with the mechanical skimmer device inserted into the hole, the strainer being beneath the ice (in the water) and the handle being compressed to its inserting position.

Referring to the drawing, in detail, the mechanical strainer device assembly 3 can be best understood in its application for ice fishing as the description of the various parts is more particularly set forth. The particular design and design lines of the skimmer construction are related to the style and particular construction shown and changes for many reasons, some of which will be set forth, can be made for adapting changes in simple design to a particular type or change as desired, both as to size and perhaps quality of construction.

The invention, as shown in vertical longitudinal elevation in FIG. 1, is generally designated at 3 as to its complete assembled construction. The skimmer is comprised, in the design illustrated, of an elongated arm member 11 having a handle extension 2, approximately 90° to the main arm section 11, at its upper end. In proximity to the handle 2 is a tubular trigger lever 4 hingedly connected at 30, by a rivet or pin, and is essentially in the same vertical plane as the handle 2. The trigger lever 4 has connected, for free longitudinal movement along the arm member 11, a lifting rod 5 which is curved and formed to operative movement as the lever 4 is urged from one position to another. The connection at 6 permits movement of lever 4 and the subsequent upward or downward movement of rod 5.

A coil spring 23, has one end thereof attached, for pressing and spring action, at 6 and its other end attached at 7. This coil spring, in its extended and pulling action condition, continuously urges the lever 4 to a downward position, as in FIG. 2, and thereby linkage and rod 5 successively moves to its lower position.

Figure 2:
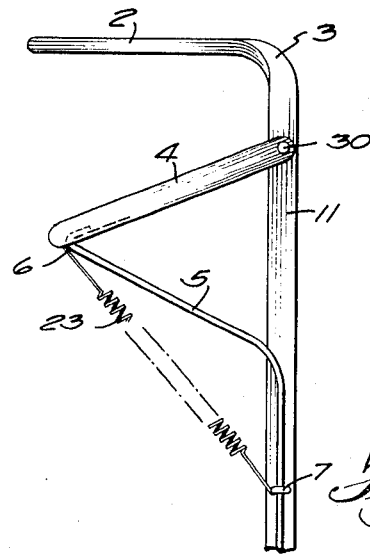
FIG. 2 is a complementary view (with reference to FIG. 1) wherein the trigger has been released and the spring action of the spring, through the linkage, results in the pivotal action of the strainer device from its 'inserting position' to a horizontal position.
Figure 3:
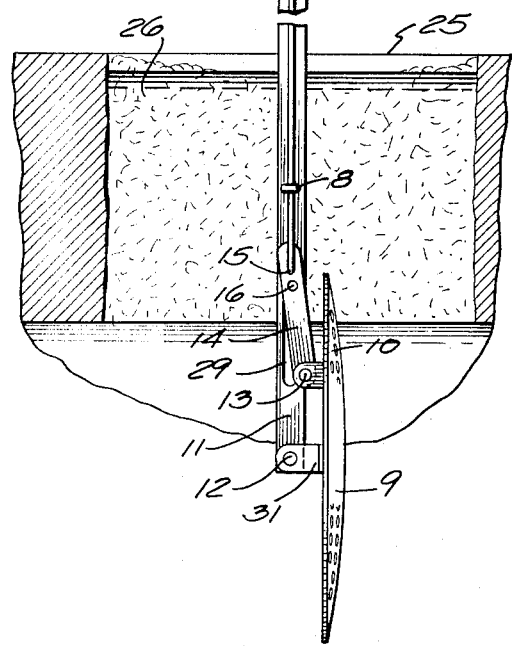
FIG. 3 is a side view of the device as shown in FIG. 2, showing in more detail and in cross-section the skimmer portion and the side view of the linkable pieces at the lower extremities of the device.
Figure 3:
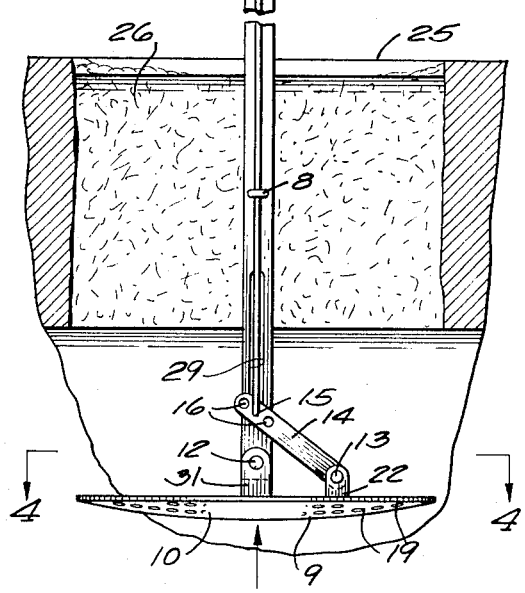
Figure 3:
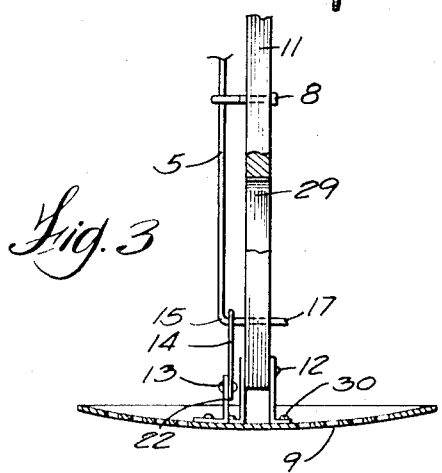
Figure 4:
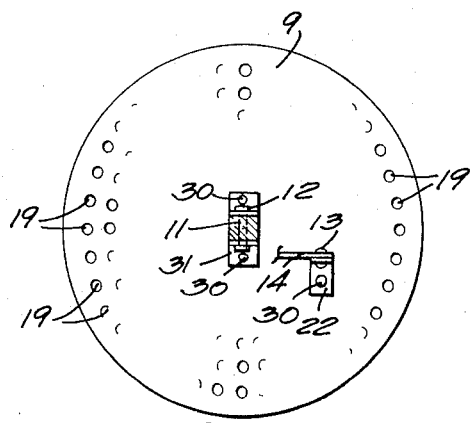
FIG. 4 is a sectional view of FIG. 2 taken through the skimmer assembly, substantially upon the plane indicated by the section line 4—4 of FIG. 2.

Rod 5 is supported along arm 11 by a series of eyelike supporting pins 7 and 8, which permit movement in a free manner of the rod therethrough during operative and successive movement of lever 4. The lower end of the rod 5, as shown in FIG. 2 and FIG. 3 shows the bent and extension 17 of the rod 5, which is inserted through one of the hole 15 or 16 of the linkage piece 14 and further is inserted through a longitudinal opening 29 in the lower end of the arm 11. This opening 29, together with the limiting motion and movement of the supports 7 and 8, restricts the motion and action of the arm and thereby provides a positive track for the linkage operation.

The cup-shaped skimmer designated as 9 is an aluminum or metal round perferated member which has an extension linkage piece 31 riveted or connected thereto on the upper side by rivets 30. Also, an arm piece 22, offset a distance from the center and piece 31, is connected to the upper side of the skimmer 9 by a rivet 30 or other comparable means. Linkage piece 14 is pivotally connected by a pin 13 to piece 22. The pivotal connection at 12 of the cup-shaped skimmer and the linkage action of the device permits movement from a normally spring urged position as shown in FIG. 2 of the skimmer 9 to its insertion position as shown in FIG. 1. The bottom 10 of the skimmer piece 9 is a smooth and perhaps teflon coated device which permits operation and prevention of accumulation of frozen ice accumulating on the device.

The selection of either or from several holes 16 in piece 14 is provided, should a larger or smaller size skimmer 9 be chosen. Removal of pins 13 and 12 would allow assembly of another size skimmer such as 9. Obviously the number of holes 19 in the skimmer 9 would be a choice determined for construction and appearance in use of the device.

The invention utilizes a simple construction and minimal number of pieces, having a positive operative action. The normal position of the skimmer 9 is shown in FIG. 2; after gripping and action of the trigger 4, resulting in movement of the linkage and 5 (rod) positions the skimmer as shown in FIG. 1. So long as the operator holds the device in this condition the device is in its insertion position for lowering into the water below the ice. When once lowered the lever 4 is released and spring 23 urges the device and skimmer 9 to its position shown in FIG. 2, ice is then removed from the hole and squeezing action of lever 4 flips or urges the ice so collected off the skimmer 9.

The device in actual construction provides a very simple and effective device for operative ice removal by a fisherman. It is obvious from practice that ice forms near the top of a hole as at 25 and the hole 26 formed in the various ways available should be kept clear of chips or reformed ice during fishing to prevent the line freezing or conditions prohibiting the most efficient fishing operation.

Although but a single embodiment of the present invention has been illustrated and described, it becomes apparent to those skilled in the art that various changes and modifications may be made therein without departing from the spirit of the invention or from the scope of the appended claims.

I claim:

1. A mechanical ice fishing skimming assembly, comprising:

A first member having a handle section therewith, and said first member being an elongated rigid metal arm having a plurality of guide supports extending therefrom, said supports having openings therein, a rod extending substantially from one end of the arm to the other and being moveably mounted along the arm and through the openings in the support for controlled and defined movement, a trigger member pivotally mounted on said arm and operable with the handle section and having connected at its extended end the upper portion of the rod, said rod having at its lower end a portion thereof for providing a part of a linkage connection, a cup-shaped perforated member hingedly mounted at the center thereof to the lower end of the first member, a link member hingedly connected to the top of the cup-shaped member at a point spaced from the hinged connection point of the lower end of said first member, said link having provided therein an opening and accommodating the lower end of said rod therein, whereby movement of the trigger member through the lnk action of the skimmer assembly causes the cup-shaped member to move from a substantially horizontal flat position to a vertical position, and spring means for urging the device through the trigger member to its position providing horizontal disposition of the cup-shaped member, said mechanical ice fishing skimming assembly having its first member and parts assembled therewith of such a length that the operator may stand and in a standing position remove the ice from an ice hole, thereby preventing the need for kneeling down for such operation.

2. The mechanical ice fishing skiming assembly according to claim 1, wherein the link member has a plurality of openings therein to accommodate a variety of size cup-shaped members and wherein the assembly permits easy removal of the cup-shaped member to the desired use of the operator.

3. The mechanical ice fishing skimming assembly according to claim 1, wherein the device is made of metal parts and has a coating of teflon on the linkage and cup-shaped member portions.

4. The mechanical ice fishing skimming assembly according to claim 1 wherein the operable link and rod assembly restricts movement of the cup-shaped member from an essentially horizontal disposition to a substantially vertical position and the operable movement between such movements through the spring means causes continuously relatively fast return of the device to its horizontal position when the trigger member is released by hand operation of the operator.

* * * * *